United States Patent
Wang et al.

(10) Patent No.: US 6,373,021 B1
(45) Date of Patent: Apr. 16, 2002

(54) METHOD FOR ELECTRICAL RESISTANCE WELDING A METAL TUBE TO A METAL SHEET

(75) Inventors: Pei-Chung Wang, Troy; Ningjian Huang, Rochester Hills, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/771,518

(22) Filed: Jan. 25, 2001

(51) Int. Cl.[7] ............................. B23K 9/28; B23K 11/00
(52) U.S. Cl. ...................... 219/93; 219/94; 219/117.1; 219/59.1
(58) Field of Search ..................... 219/93, 94, 59.1, 219/117.1, 119, 78.11, 78.15

(56) References Cited

U.S. PATENT DOCUMENTS

| | | | |
|---|---|---|---|
| 3,597,574 A | * | 8/1971 | Erlandson .................. 219/105 |
| 4,066,861 A | * | 1/1978 | Broodman ................... 219/61 |
| 4,480,166 A | * | 10/1984 | Leech ........................ 219/118 |
| 4,949,895 A | * | 8/1990 | Sugiyama et al. .......... 228/175 |
| 5,283,413 A | * | 2/1994 | Favre-Tissot ................ 219/93 |
| 5,720,092 A | * | 2/1998 | Ni et al. .................... 29/421.1 |
| 5,931,520 A | * | 8/1999 | Seksaria et al. .............. 296/70 |
| 6,089,617 A | * | 7/2000 | Craig et al. ............... 285/288.1 |
| 6,302,478 B1 | * | 10/2001 | Jaekel et al. ................ 296/205 |

* cited by examiner

Primary Examiner—Tom Dunn
Assistant Examiner—L. Edmondson
(74) Attorney, Agent, or Firm—Jeffrey A. Sedlar; George A. Grove

(57) ABSTRACT

A method for forming an electrical resistance weld between a metal tube and a metal sheet is disclosed. In the method, a plurality of generally circular protrusions having generally triangular cross sections is formed upon the sheet. Thereafter, electrodes are utilized to flex the tube, while an electrical current is generated for electric resistance welding the sheet to the tube.

11 Claims, 3 Drawing Sheets

METHOD FOR ELECTRICAL RESISTANCE WELDING A METAL TUBE TO A METAL SHEET

TECHNICAL FIELD

The present invention relates to electrical resistance welding of hydroformed metal tubing with metal sheet for assembling automotive structures.

BACKGROUND OF THE INVENTION

Recent developments in metal forming technology have permitted the manufacture of automotive vehicle frames and other support members using hydroformed metal tubes. Hydroformed tubes are attractive for automotive vehicles because they afford lightweight and high integrity structures. In many applications, it is desirable to weld such tubes to sheet metal. However, in some instances, the closed nature of such hydroformed tubes imposes practical constraints on localized welding. Conventional spot welding may be employed. However, to improve process efficiency, particularly where selective control over weld nugget formation is desired, and to extend the useful lives of electrodes, there is a need for techniques alternative to conventional spot welding for achieving high integrity localized welding of hydroformed metal tubes to sheet metal.

SUMMARY OF THE INVENTION

The present invention provides an improved method for electrical resistance welding a hydroformed metal tube with a metal sheet to make an automotive vehicle structure. A hydroformed metal tube is contacted with a protrusion pattern that has been formed on the metal sheet. The protrusion pattern is defined by a plurality of generally circular and concentric protrusions having triangular cross sections. Using resistance welding electrodes, a portion of the tube is flexed for contacting the outermost protrusion of the pattern. While the tube is in the flexed state, an electrical current is applied to initiate melting from the outermost concentric protrusions radially inward. Upon solidification, a weld nugget results having an outside diameter approximating the outside diameter of the protrusion pattern. The present invention thus meets the need in the art for an improved welding technique affording selective control over nugget formation, reduced energy consumption and prolonged electrode life.

These and other aspects and advantages of the present invention will become apparent upon reading the following detailed description in combination with the accompanying drawings.

DESCRIPTION OF THE PREFERRED EMBODIMENT

Figure 1A:
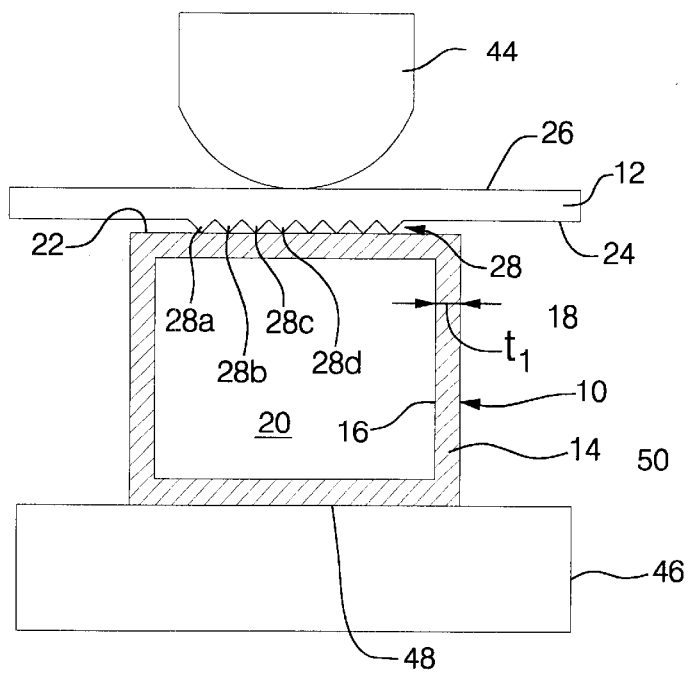
FIG. 1A illustrates a sectional view of a hydroformed tube being welded to a metal sheet employing a protrusion pattern of the invention, prior to flexing of the tube.
Figure 1B:
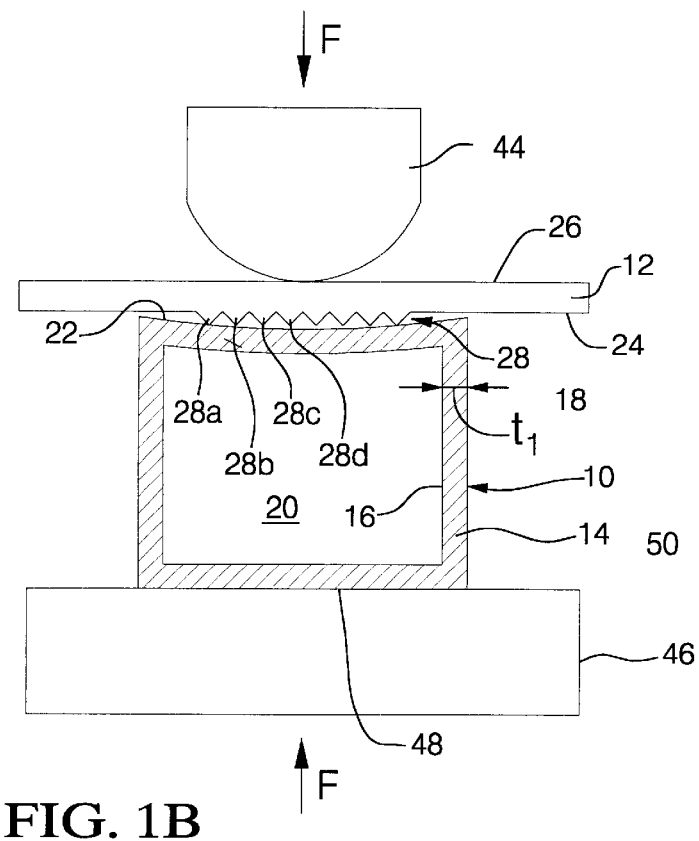
FIG. 1B illustrates another sectional view of the tube and sheet of FIG. 1A during flexing of the tube.

Referring to FIGS. 1A and 1B, a section of a hydroformed metal tube 10 is welded to a metal sheet 12. The tube 10 includes a generally continuous wall 14 having an inner surface 16 and an outer surface 18 separated by a first thickness $t_1$, which is about 0.6 mm to about 3.0 mm and preferably about 1.2 mm. The inner surface 16 of the tube 10 generally defines a passageway 20 that extends along a length of the tube 10. The outer surface 18 includes at least one generally planar wall 22 for welding to the sheet 12. The wall 22 is flexed during welding as shown in FIG. 1B.

The metal sheet 12 includes a first generally planar surface 24 and a second generally planar surface 26 separated by a second thickness $t_2$, which is about 0.6 mm to about 3.0 mm. Preferably, the metal sheet 12 is formed of 0.8 mm gage coated (e.g., galvanized, galvannealed or the like) steel.

Figure 2A:
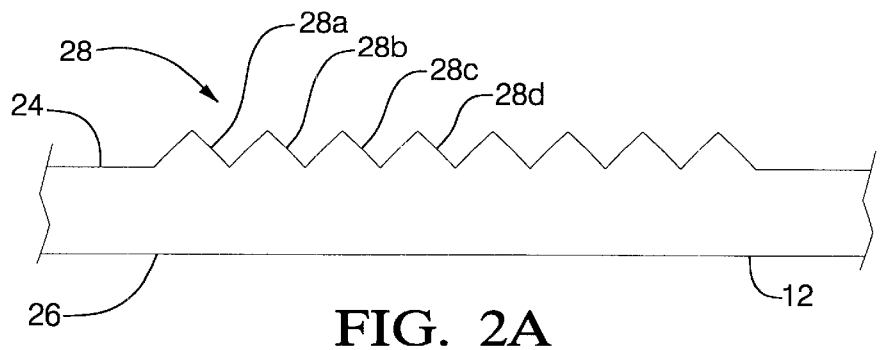
FIG. 2A illustrates a side sectional view of the protrusion pattern in a metal sheet.
Figure 2B:
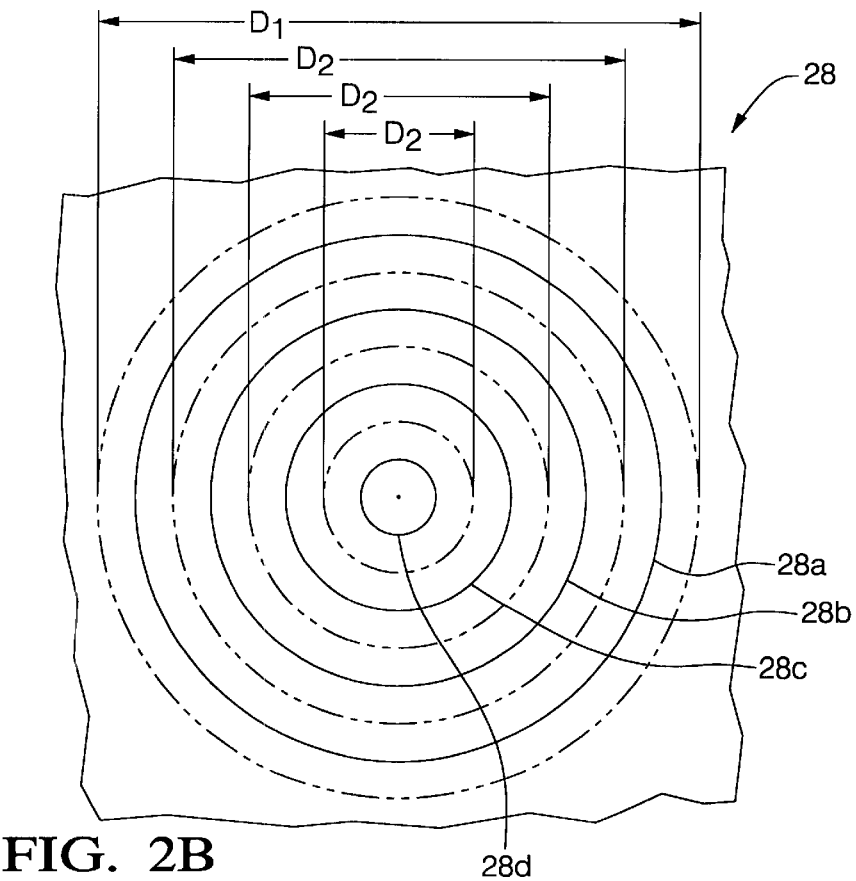
FIG. 2B illustrates a top view of the protrusion pattern of FIG. 2A.

Referring to FIG. 2B, the metal sheet 12 includes a protrusion pattern 28 that includes a plurality of generally circular protrusions 28a, 28b, 28c, 28d, which are generally concentric relative to each other and respectively have progressively smaller diameters $D_1$, $D_2$, $D_3$, $D_4$.

Figure 2C:
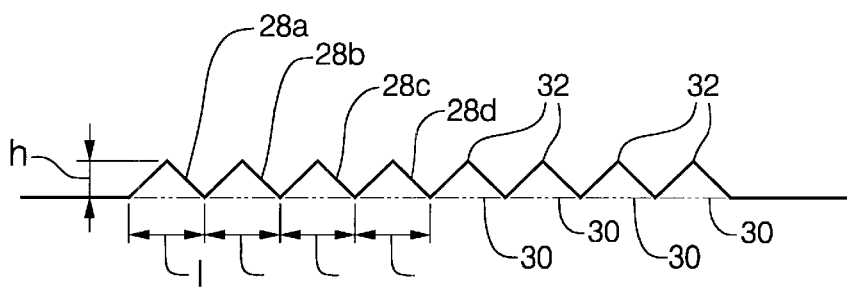
FIG. 2C illustrates a sectional view of only the protrusions of the pattern of FIGS. 2A and 2B.

As shown in FIGS. 2A–2C, each of the protrusions 28a–28d have substantially identical generally triangular cross sections with a base 30 and an apex 32. Each base 30 has a length 1 of about 0.4 to 0.6 millimeters, and each of the protrusions 28(a)–28(d) has a height h from the center point of its base 30 to the apex 32 of about 0.15 to about 0.25 millimeters.

Figure 3:
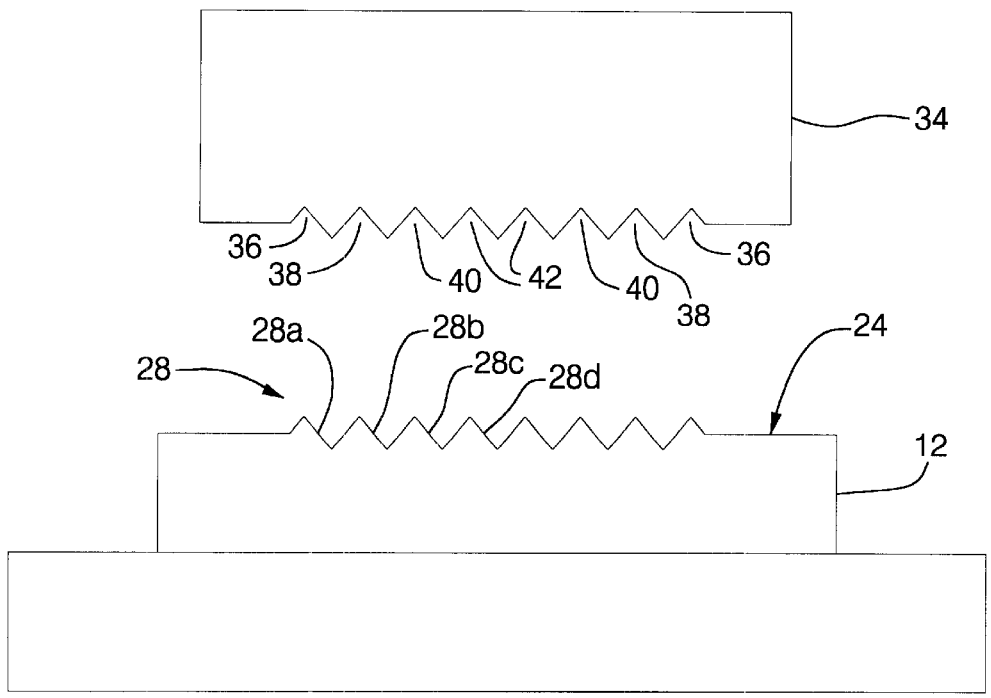
FIG. 3 illustrates a side sectional view showing formation of the protrusion pattern.

Referring to FIG. 3, the protrusion pattern 28 is formed in the sheet 12 with a tool 34 (e.g., a punch or die) having four concentric channels 36, 38, 40, 42 for complementarily defining the pattern 28.

Referring again to FIGS. 1A and 1B, for welding, at least one of the protrusions 28a, 28b, 28c, 28d is contacted with the wall 22 of the tube 10. Current from welding electrodes 44, 46 is then applied to the sheet 12 and the tube 10 for resistance welding. For instance, a first copper ball or b-nose welding electrode 44 is placed into contact with the second surface 26 of the metal sheet 12 opposite the protrusion pattern 28 extending from the first surface 24. A copper back-up welding electrode 46 is placed into contact with a second surface 48 of the tube 10 near the desired weld location. The second welding electrode 46 includes a surface 50 that generally mates with the second surface 48 of the tube 10 near the desired weld location for supporting the tube 10.

As shown in FIG. 1B, at least during the initial welding, the electrodes 44, 46 apply a force upon the tube 10 and upon the sheet 12 sufficient to flex the wall 22 of the tube 10 toward the second surface 48 of the tube 10 or away from the inner part of the protrusion pattern 28, thus maintaining the outermost protrusion 28a in contact with the flexed wall 22 of the tube 10, but leaving a space between the surface 22 of the tube 10 and at least one but, preferably, all of the innermost protrusions 28b–28d.

While the wall 22 of the tube 10 is flexed, current is applied to the protrusion pattern 28 for heating and melting the outer concentric protrusion 28a. As the outer protrusion 28a melts, the next inner protrusion 28b contacts the flexed wall 22 and is heated and melted followed by the other two inner protrusions 28c, 28d respectively.

Subsequent cooling results in a weld nugget, which attaches the sheet 12 to the tube 10. The nugget has an outer diameter of about the same diameter $D_1$ of the outer protrusion 28a, and the nugget is formed without substantial loss or migration of metal from the weld location.

Advantageously, consecutively melting the protrusions 28a-28d of the protrusion pattern 28 and then solidifying the melted metal in the manner prescribed above helps assure that even the most inner protrusion 28d is melted and then solidified such that an internally continuous weld nugget is formed.

Also advantageous, the electrodes 44, 46 can melt the protrusions 28a–28d quickly while applying minimal force to the sheet 12 and tube 10, thereby increasing the useful lives of the electrodes 44, 46 and decreasing the likelihood of permanent deformation of the sheet 12. Such technique is particularly attractive for welding more brittle metals such as coated high strength steel.

Figure 4:
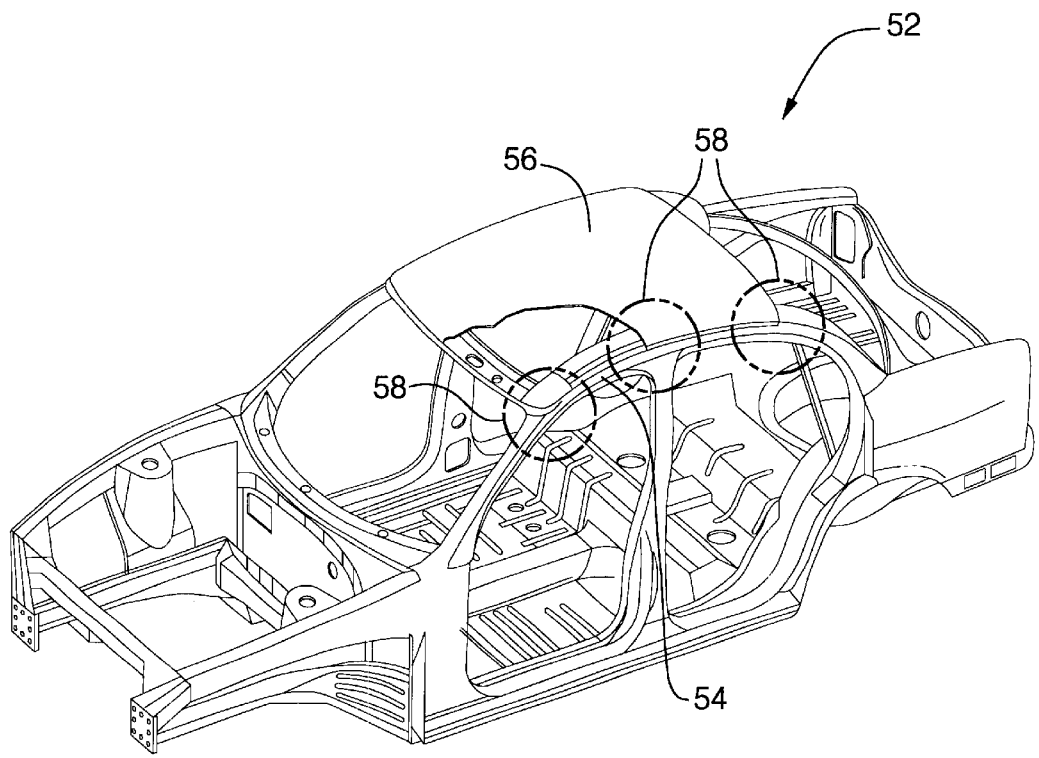
FIG. 4 illustrates welding of an automotive vehicle roof panel to a hydroformed frame with a plurality of welds.

By way of example, in FIG. 4 there is a vehicle 52 having a hydroformed tube roof rail 54 with a 1.2 millimeter wall thickness and a 0.8 millimeter thick coated steel sheet roof panel 56. The roof panel 56 (or an associated roof rail bracket) is formed with the protrusion pattern 28 of FIGS. 2A–2C spaced at weld locations 58 adjacent an edge of the panel 56. Using an electrode force of about 222 N for locally flexing the roof rail 54 at the weld site, approximately 8 kA of current is applied for about seven cycles (1 cycle=1/60 second). Upon completion, weld nuggets at the weld locations 58 weld the roof panel 56 or an associated roof rail bracket to the roof rail 54.

It should be understood that the invention is not limited to the exact embodiment or construction which has been illustrated and described but that various changes may be made without departing from the spirit and the scope of the invention.

What is claimed is:

1. A method of electrical resistance welding a hydroformed metal tube and a metal sheet for an automotive vehicle structure, comprising the steps of:
   (a) providing a hydroformed metal tube having a wall thickness in the range of about 0.6 millimeter to about 3 millimeters, said tube having a planar wall portion;
   (b) providing a metal sheet for welding to said metal tube and having a thickness of about 0.6 millimeter to about 3 millimeters at a location for a weld;
   (c) forming a protrusion pattern having an outside diameter including a plurality of generally circular and generally concentric protrusions at said weld location, said protrusions being generally triangular in cross section, each triangular cross section having a base and an apex, each base having a length of about 0.4 to about 0.6 millimeter, each protrusion having a height of about 0.15 to about 0.25 millimeters from said base to said apex;
   (d) contacting at least a portion of said protrusion pattern of said sheet with said planar surface of said metal tube;
   (e) applying force to said sheet and said tube with resistance welding electrodes for flexing said planar wall portion of said tube and for promoting contact between an outermost one of said protrusions and said tube;
   (f) passing an electrical current between said welding electrodes through said protrusions and said tube for melting metal to form a weld nugget between said sheet and said tube; and
   (g) solidifying said molten metal to form a weld nugget having an outside diameter approximating said outside diameter of said protrusion pattern.

2. A method as in claim 1 wherein said sheet is coated steel.

3. A method as in claim 1, wherein said plurality of protrusions includes four protrusions including an outer protrusion and three inner protrusions and said step of applying pressure to said sheet and said tube tends to flex said tube such that only said outer protrusion is in substantial contact with said tube and such that said outer protrusion can melt prior to said inner protrusions during said step of passing an electrical current through said electrodes.

4. A method as in claim 1, wherein said tube is generally rectangular in cross section.

5. A method as in claim 1, wherein one of said electrodes is a copper back-up having a surface for substantially supporting said tube near said desired weld location during formation of said weld nugget.

6. A method of forming an electrical resistance weld at touching surfaces of a hydroformed metal tube and a metal sheet, said metal tube having a wall and a first generally planar wall portion, said wall having a thickness in the range of about 0.6 millimeter to about 3 millimeters, said sheet initially having a thickness of about 0.6 millimeter to about 3 millimeters at the location of said weld, said method comprising the steps of:

forming a plurality of generally circular and generally concentric protrusions in at least one generally planar surface of said sheet at an intended weld location, said protrusions being generally triangular in cross section, said protrusions having a base of said triangular cross section with a length of about 0.4 to about 0.6 millimeter and a height of said triangular cross-section of about 0.15 to about 0.25 millimeters;

placing said protrusions of said sheet in contact with said planar wall portion of said metal tube at a desired location of said weld;

pressing welding electrodes against a second planar surface of said sheet and against a second surface of said tube effective to promote contact between said protrusions and said first generally planar surface of said metal tube; and passing an electrical current through said protrusions and said generally planar wall portion of said metal tube to form a weld nugget comparable in size to an area defined by said protrusions without substantial loss of metal from the weld location.

7. A method as in claim 1 wherein said sheet is coated steel.

8. A method as in claim 1, wherein said plurality of protrusions includes exactly four protrusions including an outer protrusion and three inner protrusions and said step of pressing welding electrodes against said sheet and said tube tends to flex said tube such that only said outer protrusion is in substantial contact with said tube and such that said outer protrusion can melt prior to said inner protrusions during said step of passing an electrical current through said electrodes.

9. A method as in claim 1, wherein said tube is generally rectangular in cross section.

10. A method as in claim 1, wherein one of said electrode is a copper back-up having a surface for substantially supporting said tube near said desired weld location during formation of said weld nugget.

11. A method for joining a roof panel to a hydroformed roof rail tube of an automobile, comprising the steps of:

(a) providing a hydroformed steel roof rail tube having a wall thickness of about 0.6 millimeter to about 3 millimeters, said tube having a planar wall portion;

(b) providing a galvanized steel roof panel having a thickness of about 0.6 millimeter to about 3 millimeters at a location for a weld;

(c) forming a protrusion pattern in said galvanized roof panel at a location for opposingly contacting said hydroformed roof rail tube, said protrusion pattern having an outside diameter of about 5 millimeters and including a plurality of generally circular protrusions that are generally concentric protrusions at said weld location, said protrusions being generally triangular in cross section, each triangular cross section having a base and an apex, each base having a length of about 0.4 to about 0.6 millimeter, each protrusion having a height of about 0.15 to about 0.25 millimeters from said base to said apex;

(d) contacting at least a portion of said protrusion pattern with said hydroformed roof rail tube at said planar wall portion;

(e) applying a force with opposing electrodes to said protrusion pattern and said 1.2 millimeter thick hydroformed roof rail tube of at least about 100 N such that only said outer protrusion initially is in substantial contact with said tube;

(f) applying a current of at least about 8 kA between said electrodes for melting metal to form said weld at said protrusion pattern, said outer protrusion melting prior to said inner protrusions during said step of passing an electrical current through said electrodes; and (g) solidifying said molten metal to form a weld nugget between said sheet and said tube.

\* \* \* \* \*